(12) United States Patent
Komich

(10) Patent No.: US 12,204,583 B2
(45) Date of Patent: Jan. 21, 2025

(54) RECOMMENDING NEW MUSICAL TRACKS FOR PLAYLISTS

(71) Applicant: Honda Motor Co., Ltd., Tokyo (JP)

(72) Inventor: Matt Komich, Denver, CO (US)

(73) Assignee: Honda Motor Co., Ltd., Tokyo (JP)

( * ) Notice: Subject to any disclaimer, the term of this patent is extended or adjusted under 35 U.S.C. 154(b) by 357 days.

(21) Appl. No.: 17/868,532

(22) Filed: Jul. 19, 2022

(65) Prior Publication Data
US 2024/0028642 A1    Jan. 25, 2024

(51) Int. Cl.
*G06F 16/68* (2019.01)
*G06F 16/635* (2019.01)
*G06F 16/638* (2019.01)
*G06F 16/687* (2019.01)

(52) U.S. Cl.
CPC .......... *G06F 16/639* (2019.01); *G06F 16/635* (2019.01); *G06F 16/686* (2019.01); *G06F 16/687* (2019.01)

(58) Field of Classification Search
CPC .... G06F 16/639; G06F 16/687; G06F 16/635; G06F 16/686
See application file for complete search history.

(56) References Cited

U.S. PATENT DOCUMENTS

| | | | |
|---|---|---|---|
| 7,769,767 B2 | 8/2010 | Petersen | |
| 9,014,832 B2 | 4/2015 | Amidon et al. | |
| 2003/0093790 A1* | 5/2003 | Logan | G06F 16/7867 |
| | | | 348/E7.071 |
| 2004/0254659 A1 | 12/2004 | Bolas et al. | |
| 2005/0020223 A1* | 1/2005 | Ellis | H04M 1/6083 |
| | | | 455/352 |
| 2015/0301692 A1* | 10/2015 | Patsiokas | H04N 21/6193 |
| | | | 715/716 |
| 2017/0161380 A1 | 6/2017 | Hsu et al. | |
| 2021/0287669 A1* | 9/2021 | Jeyachandran | H03G 3/3089 |

FOREIGN PATENT DOCUMENTS

| | | |
|---|---|---|
| CN | 201689470 U | 12/2010 |
| CN | 201690615 U | 12/2010 |
| CN | 109726310 A | 5/2019 |
| CN | 109995451 A | 7/2019 |
| CN | 111259192 A | 6/2020 |
| JP | 2008077745 A | 4/2008 |
| WO | 2009090358 A1 | 7/2009 |
| WO | 2015061222 A1 | 4/2015 |

* cited by examiner

*Primary Examiner* — Joseph Saunders, Jr.
(74) *Attorney, Agent, or Firm* — Aaron Fong; American Honda Motor Co., Inc.

(57) ABSTRACT

An electronic device and method for recommending new musical tracks for playlists. The electronic device detects a playback of a musical track associated with a first music listening service and identifies a list of tracks by accessing user data associated with a second music listening service that is different from the first music listening service. The list of tracks includes at least one of a set of playlists or a music library of favorite tracks. The electronic device determines the musical track as a missing list item in content of the list of tracks and generates a notification that includes information associated with the musical track and a prompt to add the musical track as a list item of the list of tracks. The notification is generated based on a determination that the musical track is the missing list item. A display is thereafter controlled to render the generated notification.

20 Claims, 13 Drawing Sheets

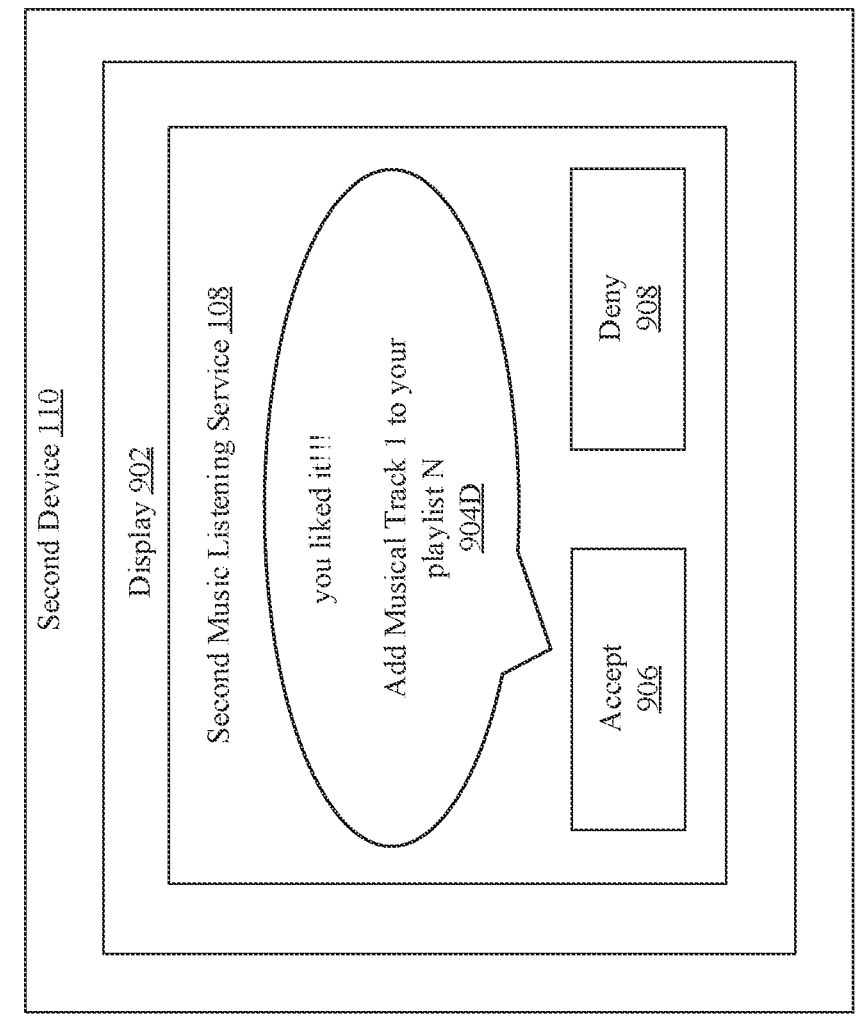

RECOMMENDING NEW MUSICAL TRACKS FOR PLAYLISTS

BACKGROUND

Advancements in data analytics and machine learning have enabled on-demand music streaming services to recommend new songs to users via respective applications. In such applications, a user may typically see a page or a different GUI element that lists the new songs as a recommendation. Typically, an on-demand streaming service collects user data associated with activities of a user on music application(s) managed by the service. Such activities may include, for example, a search history, a music purchase history, a browsing history, and the like. In most scenarios, the source may be limited to music application(s) managed by the on-demand streaming service. As users may discover new songs from a variety of sources (e.g., a music streaming service, a radio service, etc.), it may be imperative for many on-demand music streaming services to identify and recommend songs that the user may have already listened on other platforms.

Limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, an electronic device for recommending new musical tracks for playlists is provided. The electronic device may detect a playback of a musical track associated with a first music listening service and may identify a list of tracks by accessing user data associated with a second music listening service that may be different from the first music listening service. The list of tracks may include at least one of a playlist or a music library of favorite tracks. The electronic device may determine the musical track as a missing list item in content of the list of tracks and may generate a notification that includes information associated with the musical track and a prompt to add the musical track as a list item of the list of tracks. The notification may be generated based on a determination that the musical track is the missing list item. A display may thereafter be controlled to render the generated notification.

According to another embodiment of the disclosure, a method for recommending new musical tracks for playlists is provided. The method may include detecting a playback of a musical track associated with a first music listening service and identifying a list of tracks by accessing user data associated with a second music listening service that may be different from the first music listening service. The list of tracks may include at least one of a playlist or a music library of favorite tracks. The method may further include determining the musical track as a missing list item in content of the list of tracks and generating a notification that includes information associated with the musical track and a prompt to add the musical track as a list item of the list of tracks. The notification may be generated based on the determination that the musical track is the missing list item. The method may further include controlling a display to render the generated notification.

According to another embodiment of the disclosure, a non-transitory computer-readable medium is provided. The non-transitory computer-readable medium may have stored thereon computer implemented instructions that, when executed by an electronic device, causes the electronic device to execute operations. The operations may include detecting a playback of a musical track associated with a first music listening service and identifying a list of tracks by accessing user data associated with a second music listening service that may be different from the first music listening service. The list of tracks may include at least one of a playlist or a music library of favorite tracks. The operations may further include determining the musical track as a missing list item in content of the list of tracks and generating a notification that includes information associated with the musical track and a prompt to add the musical track as a list item of the list of tracks. The notification may be generated based on the determination that the musical track is the missing list item. The operations may further include controlling a display to render the generated notification.

BRIEF DESCRIPTION OF THE DRAWINGS

FIG. 9D is a block diagram that illustrates a display of notification on an exemplary second device associated with a second music listening service, in accordance with an embodiment of the disclosure.

Figure 1:
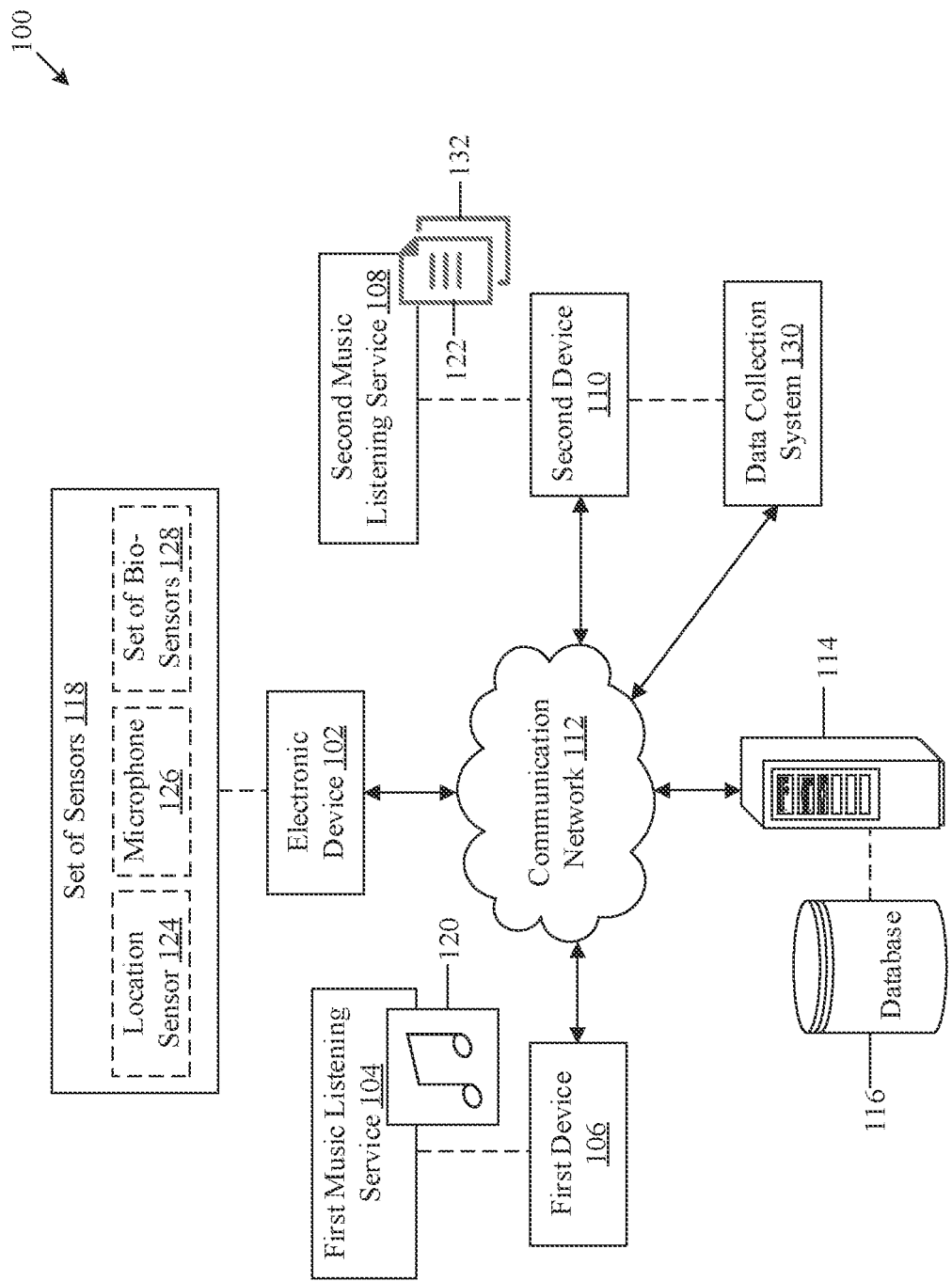
FIG. 1 is a block diagram that illustrates an exemplary network environment for discovery of a music source for music listening services and recommending new musical tracks for playlists or music library, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in the disclosed electronic device and method for recommending new musical tracks for playlists. Operations described in the method, when executed on the electronic device, may generate a notification that includes information associated with the musical track and a prompt to add the musical track as a list item of a list of tracks. The notification may be generated based on a determination that the musical track is a missing list item.

At any time-instant, the electronic device may detect a playback of the musical track associated with a first music listening service (for example, an on-demand music streaming service, an Internet radio service, or a music broadcast service). The electronic device may identify a list of tracks by accessing user data associated with a second music listening service (i.e., different from the first music listening service). The electronic device may determine the musical track as a missing list item in content of the list of tracks and may generate a notification that includes information associated with the musical track and a prompt to add the musical track as a list item of the list of tracks. The notification may be generated based on the determination that the musical track is the missing list item. The electronic device may also detect user feedback for the playback of the musical track and may determine user's affinity for the musical track to generate the notification. A display may be controlled to render the generated notification.

In contrast to conventional techniques, the disclosed electronic device may recommend a user with options to add a song or a musical track that the user likes to at least one playlist of the list of tracks if it is determined that the song or the musical track is absent in the playlists. The recommendation to add the song or the musical track may be based on a detection of a playback of the musical track or the song in vicinity of the user and/or user's affinity for the musical track or the song. The recommendation may enable the user to keep track of music that the user potentially likes but may have not added the music yet to any of the playlists. Since the disclosed electronic device relies on analysis of playlist content and user's feedback to music to correctly determine if the music should be recommended or not; therefore the analysis may offer a reduced space and time complexity on the electronic device as compared to conventional approaches that may typically collect and process larger data on users with more computationally intensive data analysis operations. Also, the generation of notifications based on user's affinity or user's taste for music may improve recommendation technology for music applications and user's experience for on-demand music streaming service providers.

Reference will now be made in detail to specific aspects or features, examples of which are illustrated in the accompanying drawings. Wherever possible, corresponding, or similar reference numbers will be used throughout the drawings to refer to the same or corresponding parts.

FIG. 1 is a block diagram that illustrates an exemplary network environment for discovery of a music source for music listening services and recommending new musical tracks for playlists or music library, in accordance with an embodiment of the disclosure. With reference to FIG. 1, there is shown a network environment 100. The network environment 100 may include an electronic device 102, a first music listening service 104, a first device 106, a second music listening service 108, a second device 110, a communication network 112, a server 114, a database 116, and a set of sensors 118. With reference to FIG. 1, there is a shown a musical track 120 that may be played via a music application on the electronic device 102 or a device communicatively coupled to the electronic device 102. The musical track 120 may be streamed or broadcasted by the first music listening service 104. A set of playlists 122 and a music library 132 may be stored on the electronic device 102 or a device associated with the second music listening service 108.

The electronic device 102 may include suitable logic, circuitry, interfaces, and/or code that may execute a set of operations to determine a discovery source of the musical track 120 for a user and recommend new musical tracks for addition to the one or more playlists of the set of playlists 122 or the music library 132 associated with the second music listening service 108. The operations may be executed based on detection of a playback of the musical track 120. For example, the playback may be detected inside a vehicle. The playback of the musical track 120 may be performed by the first music listening service 104. Examples of the electronic device 102 may include, but are not limited to, an in-vehicle infotainment system, an in-vehicle music system, a vehicle computer, a computing device, a smartphone, a cellular phone, a mobile phone, a gaming device, a mainframe machine, a server, a computer workstation, a consumer electronic (CE) device and/or any other device with data processing capabilities.

The first music listening service 104 may represent any entity that may employ servers, software applications, and networks to broadcast or stream data including musical tracks to a device, such as the first device 106 or the electronic device 102. Examples of the first music listening service 104 may include, but are not limited to, an on-demand music streaming service, an Internet radio service, or a music broadcast service.

The first device 106 may include suitable logic, circuitry, interfaces and/or code that may be configured to render at least one of audio-based data, video-based data, and/or a user interface. In an embodiment, the first device 106 may execute one or more operations to output audio associated with the musical track 120. Examples of the first device 106 may include, but are not limited, an entertainment system, a navigation system, a vehicle user interface (UI) system, an Internet-enabled communication system, and other entertainment systems.

The second music listening service 108 may represent any entity that may employ servers, software applications, and networks to stream data including musical tracks to a device, such as the second device 110 or the electronic device 102. The second music listening service 108 may maintain the set of playlists 122 on the second device 110 or the electronic device. In some instances, the second music listening service 108 may also maintain the music library 132 that includes a list of favorite songs of the user, a list of songs liked by the user, or a list of songs in watchlist of the user. The music library 132 and each playlist of the set of playlists 122 may include a listing of one or more musical tracks and metadata such as timing information (e.g., date of addition of a musical item to playlist), a playback duration of each musical track, and singer/composer details. In some instances, one or more musical category tags may be associated with each playlist of the set of playlists 122 and the music library 132. For example, a playlist may include a rock and pop genre tag to indicate genre of songs in the playlist. Other examples of the tags may include, but is not limited to, a singer name, a music album name, or a tag for a release date of the musical item. An example of the second music listening service 108 is an on-demand music streaming service.

The second device 110 may include suitable logic, circuitry, interfaces and/or code that may be configured to render at least one of audio-based data, video-based data, and/or a user interface. The second device 110 may execute one or more operations to output audio/video associated with one or more musical tracks listed in the set of playlists 122. Examples of the second device 110 may include, but are not limited to, a computing device, a smartphone, a cellular phone, a mobile phone, a gaming device, a mainframe machine, a server, a computer workstation, an entertainment system, an Internet-enabled communication system and/or a consumer electronic (CE) device.

A person with ordinary skill in the art will understand that the scope of the disclosure may not be limited to implementation of the electronic device 102, the first device 106, and the second device 110 as separate entities. In certain embodiments, the functionalities of the first device 106 and the second device 110 may be incorporated in its entirety or at least partially in the electronic device 102, without a departure from the scope of the disclosure.

The communication network 112 may include a communication medium through which the electronic device 102, devices associated with the first music listening service 104 or the second music listening service 108, the server 114, and the database 116 may communicate. The communication network 112 may be a wired or wireless communication network. Examples of the communication network 112 may include, but are not limited to, the Internet, a cloud network, a Wireless Fidelity (Wi-Fi) network, a Personal Area Network (PAN), a Local Area Network (LAN), a mobile network (e.g., a 4$^{th}$ Generation or a 5$^{th}$ Generation network), or a Metropolitan Area Network (MAN). Various devices in the network environment 100 may be configured to connect to the communication network 112, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The server 114 may include suitable logic, circuitry, interfaces, and code that may be configured to store user data associated with the second music listening service 108. The user data may include profile information of a user associated with the second device 110 that stores the set of playlists 122. In some embodiments, the server 114 may also store information associated with the set of playlists 122 or the music library 132 stored in the second music listening service 108.

Examples of the server 114 may include, but are not limited to, a database server, a file server, a web server, a media server, an application server, a mainframe server, a cloud server, or other types of servers. In cloud implementation, the server 114 may execute operations through web applications, cloud applications, HTTP requests, repository operations, file transfer, and the like. In one or more embodiments, the server 114 may be implemented via a plurality of distributed cloud-based resources by use of several technologies that are well known to those skilled in the art. A person with ordinary skill in the art will understand that the scope of the disclosure may not be limited to implementation of the server 114 and the electronic device 102 as separate entities. In certain embodiments, the functionalities of the server 114 may be incorporated in its entirety or at least partially in the electronic device 102, without a departure from the scope of the disclosure.

The database 116 may include suitable logic, interfaces, and/or code that may be configured to store user data associated with the second music listening service 108. In some embodiments, the database 116 may also store information associated with the set of playlists 122 or the music library 132 associated with the second music listening service 108. In some cases, the database 116 may be cached and stored on the electronic device 102. The server 114 may receive a query to retrieve the user data from the electronic device 102. In response, the server 114 may retrieve and provide the queried user data from the database 116 to the electronic device 102, via the communication network 112.

The set of sensors 118 may include, for example, a location sensor 124, a microphone 126, or a set of biosensors 128. The location sensor 124 may include suitable logic, circuitry, and/or interfaces that may be configured to determine a current geo-location of the user or a vehicle associated with the user. An example implementation of the location sensor 124 may be a Global Navigation Satellite System (GNSS)-based sensor. Examples of the GNSS-based sensor may include, but are not limited to, global positioning sensor (GPS), Global Navigation Satellite System (GLONASS), or a different regional navigation system.

The set of biosensors 128 may include wearable sensors that may be in contact with at least an anatomical portion of a body of the user. In some instances, the wearable sensors may be wrapped, wound, or strapped around the anatomical portion of the body. The wearable sensors may acquire multi-modal data, such as, but not limited to, a photoplethysmography (PPG) data, temperature data, blood pressure data, or ambient oxygen partial pressure (ppO2) data. Example implementations of the wearable sensors may include, but are not limited to, a belt-type wearable sensor, a vest with embedded biosensors, a waist strap with embedded biosensors, a wrist strap with embedded biosensors, an instrumented wearable belt, a wearable garment with embedded biosensors, or a wearable article-of-manufacture having a retrofitting of biosensors.

In operation, the electronic device 102 may detect the playback of the musical track 120 associated with the first music listening service 104. The musical track may be played using the first device 106 or directly using the electronic device 102. The first music listening service 104 may be an on-demand music streaming service, an Internet radio service, or a music broadcast service. After detection of the musical track 120, the electronic device 102 may identify a playlist or a set of playlists 122 associated with the second music listening service 108. The playlist or the set of playlists 122 may be identified by accessing user data associated with the second music listening service 108. The user data may be stored in the database 116, for example.

After identification of the playlist, the set of playlists 122, or the music library 132, the electronic device 102 may determine whether the musical track 120 is present in any list of the identified set of playlists 122 or the music library 132. For example, the electronic device 102 may check for a presence of the musical track 120 in the set of playlists 122 and/or the music library 132 associated with the second music listening service 108. If the musical track 120 is present in any list of the identified set of playlists 122 or the music library 132, the electronic device 102 may determine a time of addition of the musical track 120 in at least one playlist of the set of playlists 122 or the music library 132. The electronic device 102 may determine a discovery source of the musical track 120 as one of the first music listening service 104 or the second music listening service 108, based on a time of the playback of the musical track 120 and the time of addition of the musical track 120 to any list of the set of playlists 122 or the music library 132. Source discovery may correspond to identification of a service or a platform (i.e., a discovery source) from where the user first found out about or listened to a song or a musical track for the first time. As an example, the discovery source for the musical track 120 may be the first music listening service 104 if the time of the playback of the musical track 120 precedes the time of addition of the musical track 120 to any list of the set of playlists 122 or the music library 132. As another example, the discovery source for the musical track 120 may be the second music listening service 108 if the time of addition of the musical track 120 to any list of the set of playlists 122 or the music library 132 precedes the time of the playback of the musical track 120. After the determination of the discovery source, the electronic device 102 may transmit information, including the discovery source to a data collection system 130 associated with the second music listening service 108. The information may also include metadata associated with the musical track 120.

If the musical track 120 is not present in any list of the identified set of playlists 122 or the music library 132, the electronic device 102 may determine the musical track 120 as a missing list item in content of the list of tracks including the set of playlists 122 and/or the music library 132. The electronic device 102 may generate a notification that includes information associated with the musical track 120 and a prompt to add the musical track 120 as a list item of one of a playlist of the set of playlists 122 or the music library 132. The notification may be generated based on the determination that the musical track is the missing list item. The details of the generation of the notification and the prompt are provided, for example, in FIGS. 9A, 9B, 9C, and 9D.

After the generation of the notification, the electronic device 102 may control a display to render the generated notification. As an example, the generated notification may be displayed on the display 902 of the second device 110.

The notification may include a recommendation to add the musical track 120 to at least one playlist of the set of playlists 122 or the music library 132. In particular, recommendation may be provided if it is determined that the user 302 liked the musical track 120 while driving the vehicle 304.

Figure 2:
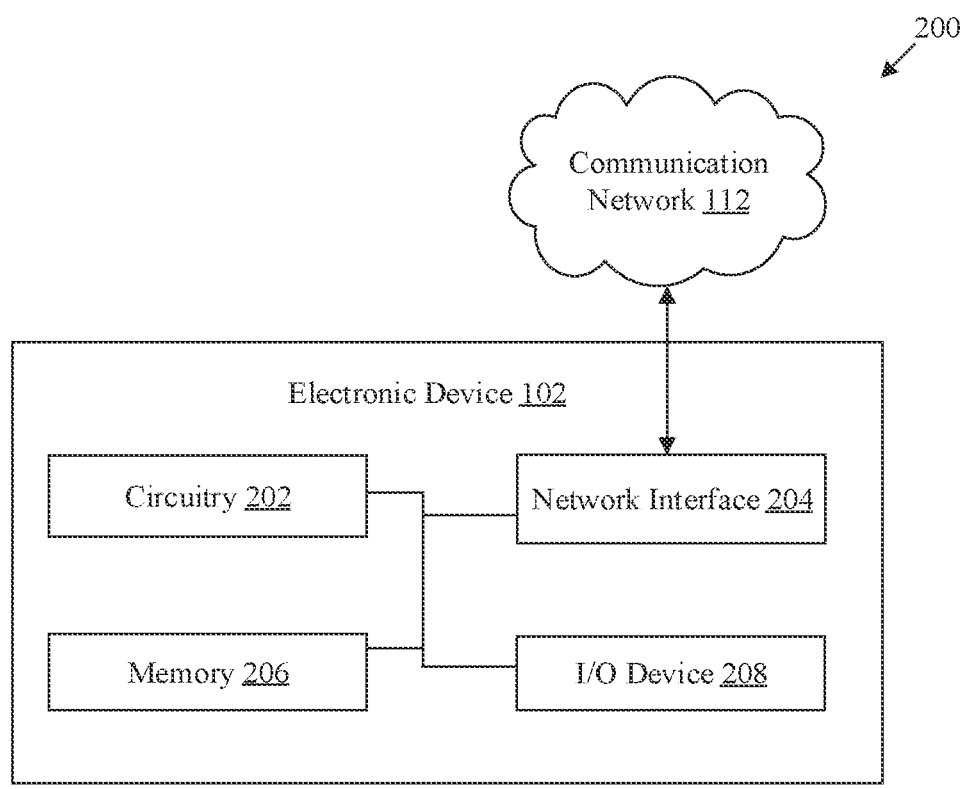
FIG. 2 is a block diagram of an exemplary electronic device for source discovery of music for music listening services and for recommending new musical tracks for playlists or music library, in accordance with an embodiment of the disclosure.

FIG. 2 is a block diagram of an exemplary electronic device for source discovery of music for music listening services and for recommending new musical tracks for playlists or music library, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202 which performs operations for a source discovery of a musical track for music listening services and for recommendation of new musical tracks to a user. Source discovery may correspond to identification of a service or a platform (i.e., a discovery source) from where the user first found out about or listened to a song or a musical track for the first time. The electronic device 102 may further include a network interface 204, a memory 206, and an input/output (I/O) device 208. The memory 206 may store the metadata of the musical track 120 that may be played via the first device 106. The circuitry 202 may be communicatively coupled to the memory 206, the I/O device 208, and the network interface 204.

The circuitry 202 may include suitable logic, circuitry, and interfaces that may be configured to execute program instructions associated with different operations to be executed by the electronic device 102. For example, some of the operations may include detection of the playback of the musical track 120, identification of the playlist, the set of playlists 122, or the music library 132, determination of the time of addition of the musical track 120 to the playlist, determination of the discovery source of the musical track as one of the first music listening service or the second music listening service, and transmission of the information including the discovery source to the data collection system 130. Alternatively, the operations may include determination of the musical track 120 as the missing list item in the content of the set of playlists 122 or the music library 132, generation of the notification that includes the information associated with the musical track 120 and the prompt to add the musical track 120 as the list item of a playlist of the set of playlists 122 or the music library 132, and controlling the display 902 to render the generated notification.

The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The network interface 204 may include suitable logic, circuitry, and interfaces that may be configured to facilitate communication between the circuitry 202 and the server 114, via the communication network 112. The network interface 204 may be implemented by use of various known technologies to support wired or wireless communication of the electronic device 102 with the communication network 112. The network interface 204 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 204 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The memory 206 may comprise suitable logic, circuitry, interfaces, and/or code that may be configured to store the metadata of the musical track 120 being played on the first device 106 via the first music listening service 104. Examples of implementation of the memory 210 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 208 may include suitable logic, circuitry, and interfaces that may be configured to receive the user input(s) and provide an output based on the received user input(s). The I/O device 208 may be configured to display at least a part of the metadata of the musical track 120. The I/O device 208 which may include various input and output devices, which may be configured to communicate with the circuitry 202. Examples of the I/O device 208 may include, but are not limited to, an audio rendering device, a touch screen, a keyboard, a mouse, a joystick, and a microphone.

Figure 3:
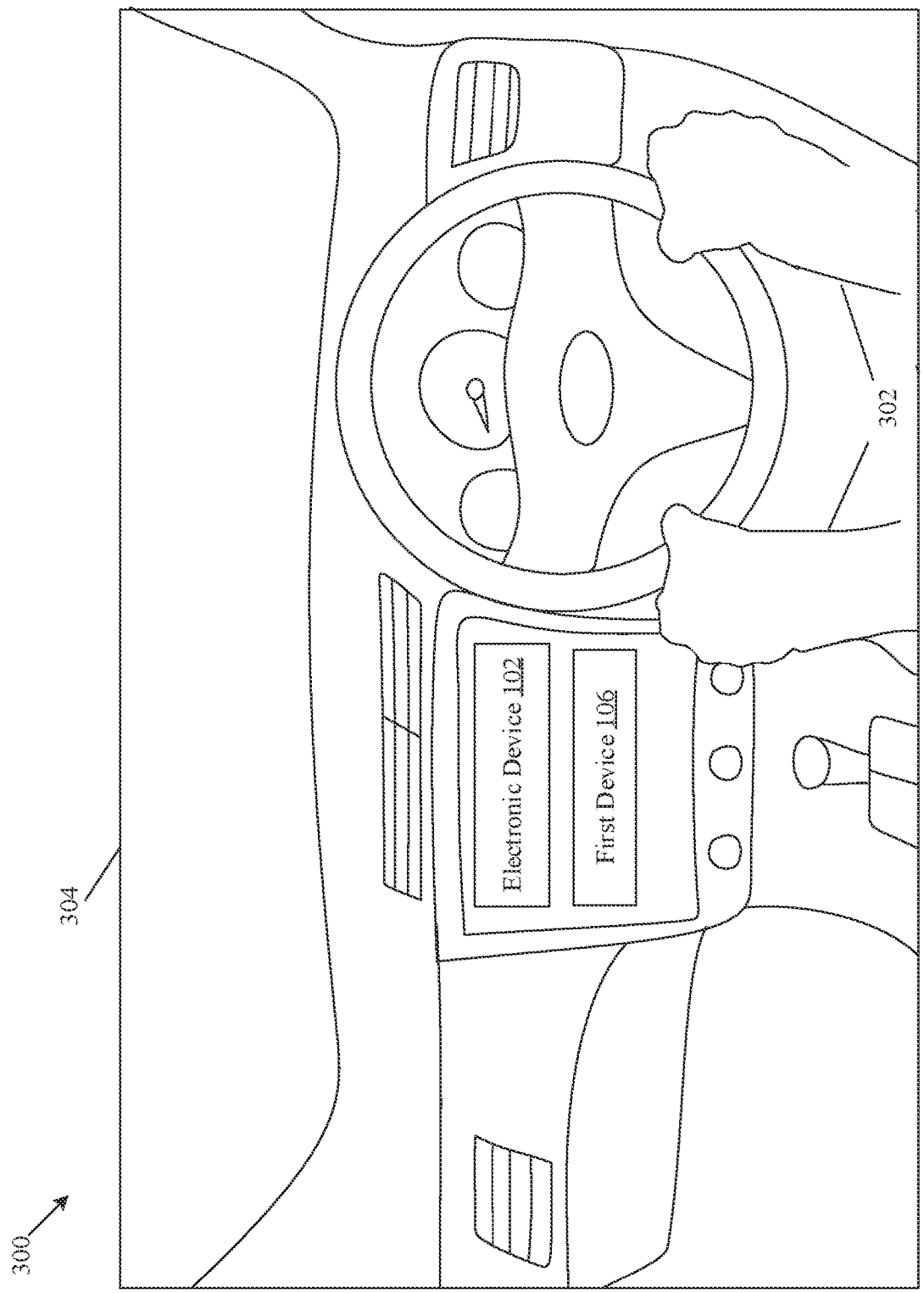
FIG. 3 is a diagram that illustrates an exemplary vehicle where playback of musical track is detected, in accordance with an embodiment of the disclosure.

FIG. 3 is a diagram that illustrates an exemplary vehicle where playback of musical track is detected, in accordance with an embodiment of the disclosure. FIG. 3 is explained in conjunction with elements from FIGS. 1 and 2. With reference to FIG. 3, there is shown a scenario diagram 300 that illustrates the user 302 driving the vehicle 304. In some instances, the user 302 may be a passenger (other than the driver) of the vehicle 304. The vehicle 304 may include the first device 106 that may perform playback of music associated with the first music listening service 104. The first music listening service 104 may stream or broadcast the musical track 120 based a request from the user 302 or based on a schedule.

The electronic device 102 may be installed in the vehicle 304. In an embodiment, the set of sensors 118 may be installed in the vehicle 304 and may include the location sensor 124, the microphone 126, or the biosensors 128. In another embodiment, one or more of the location sensor 124, the microphone 126, or the biosensors 128 may be included in the electronic device 102.

The location sensor 124 may determine a geo-location of the vehicle 304 in which the playback of the musical track 120 may be detected. The geo-location of the vehicle 304 at the time of the playback of the musical track 120 may be provided to the electronic device 102. The microphone 126 may detect an audio signal generated by the playback of the musical track 120 in the vehicle 304. The audio signal may be provided to the electronic device 102. In some instances, the microphone 126 may also detect a humming sound that resembles a tune or a melody of the musical track 120. By way of an example, and not limitation, the user 302 or co-passengers in the vehicle 304 may sing or may produce a humming sound that may resemble the tune or the melody of musical track 120 during or after the playback of the musical track 120. This humming sound may indicate that the user 302 or the co-passengers like the musical track 120. In an embodiment, the detection of the humming sound may be recorded as a user feedback for the musical track 120.

In an embodiment, the biosensors 128 may detect an emotional state of the user 302 in a duration of the playback of the musical track 120. By way of example, and not limitation, the emotional state of the user 302 may for the duration of the playback may indicate one or more of a neutral state, a happy state, a sad state, or an excited state.

Figure 4:
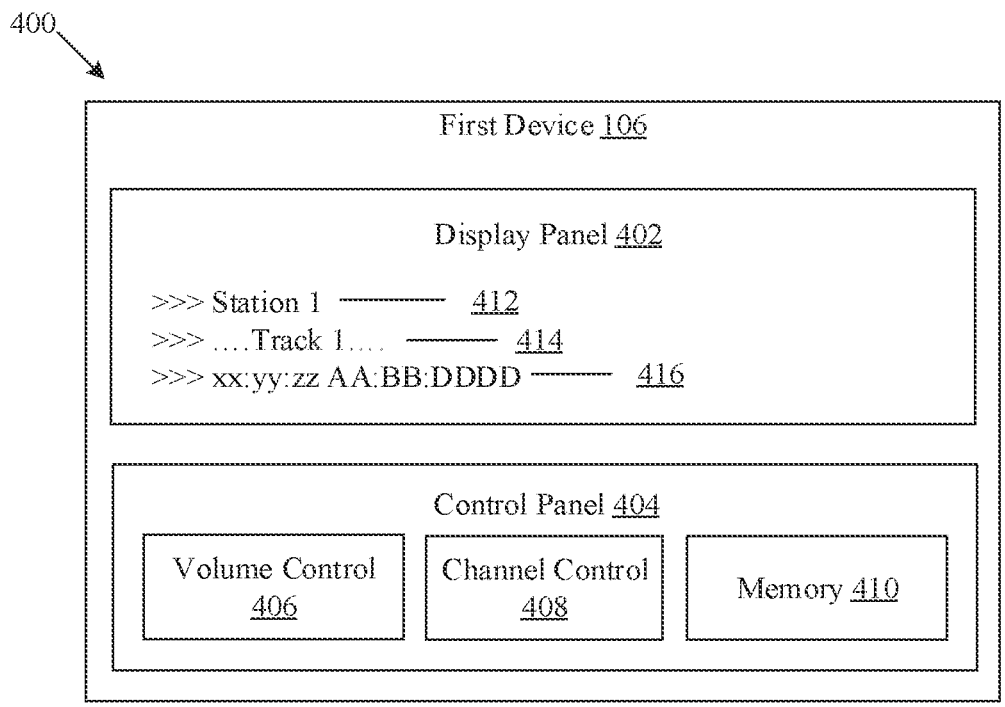
FIG. 4 is a block diagram that illustrates an exemplary first device associated with a first music listening service, in accordance with an embodiment of the disclosure.

FIG. 4 is a block diagram that illustrates an exemplary first device associated with a first music listening service, in accordance with an embodiment of the disclosure. FIG. 4 is explained in conjunction with elements from FIGS. 1-3. With reference to FIG. 4, there is shown a block diagram 400 that illustrates an interface of the first device 106 that outputs the musical track 120. In an embodiment, the first device 106 may include a display panel 402 and a control panel 404. The display panel 402 may display details of a track that may be played on the first device 106. As an example, the details displayed on the display panel 402 may include a portion of metadata 502 associated with the track being played. The details may include, for example, station name 412 of a station on which the musical track 120 is played, a track ID 414 of the musical track 120, or a time 416 of the playback of the musical track 120. In an embodiment, the control panel 404 may include a volume control 406 for controlling volume of the playback of the musical track 120, a channel control 408 for controlling the station, and a memory 410 for storing the metadata 502 of the musical track 120.

Figure 5:
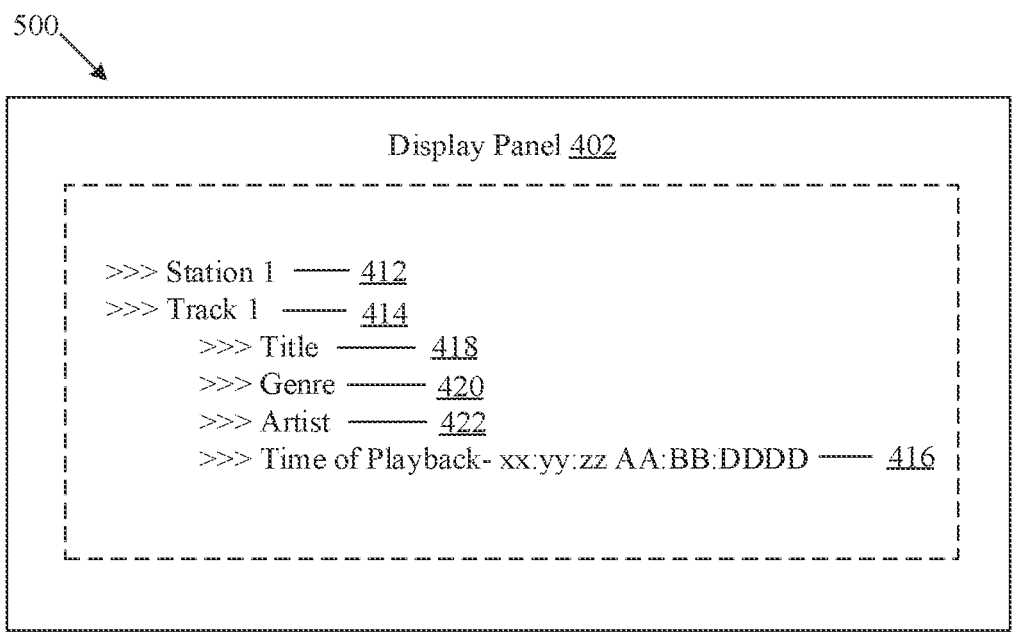
FIG. 5 is a block diagram that illustrates an exemplary display panel associated with a first music listening service, in accordance with an embodiment of the disclosure.

FIG. 5 is a block diagram that illustrates an exemplary display panel associated with a first music listening service, in accordance with an embodiment of the disclosure. FIG. 5 is explained in conjunction with elements from FIGS. 1-5. With reference to FIG. 5, there is shown a block diagram 500 that illustrates an interface of the first device 106. The memory 410 temporarily stores the metadata 502 of each musical track being played on the first device 106 via the first music listening service 104. An example of the stored metadata is displayed on the display panel 402, for example. The metadata 502 associated with the musical track 120 may include, for example, the station name 412 of a radio station or a streaming channel via which the musical track 120 is played, the track ID 414 of the musical track 120, the time 416 of the playback of the musical track 120, a title 418 of the musical track 120, a genre 420 of the musical track 120, and one or more artists 422 in the musical track 120.

Figure 6:
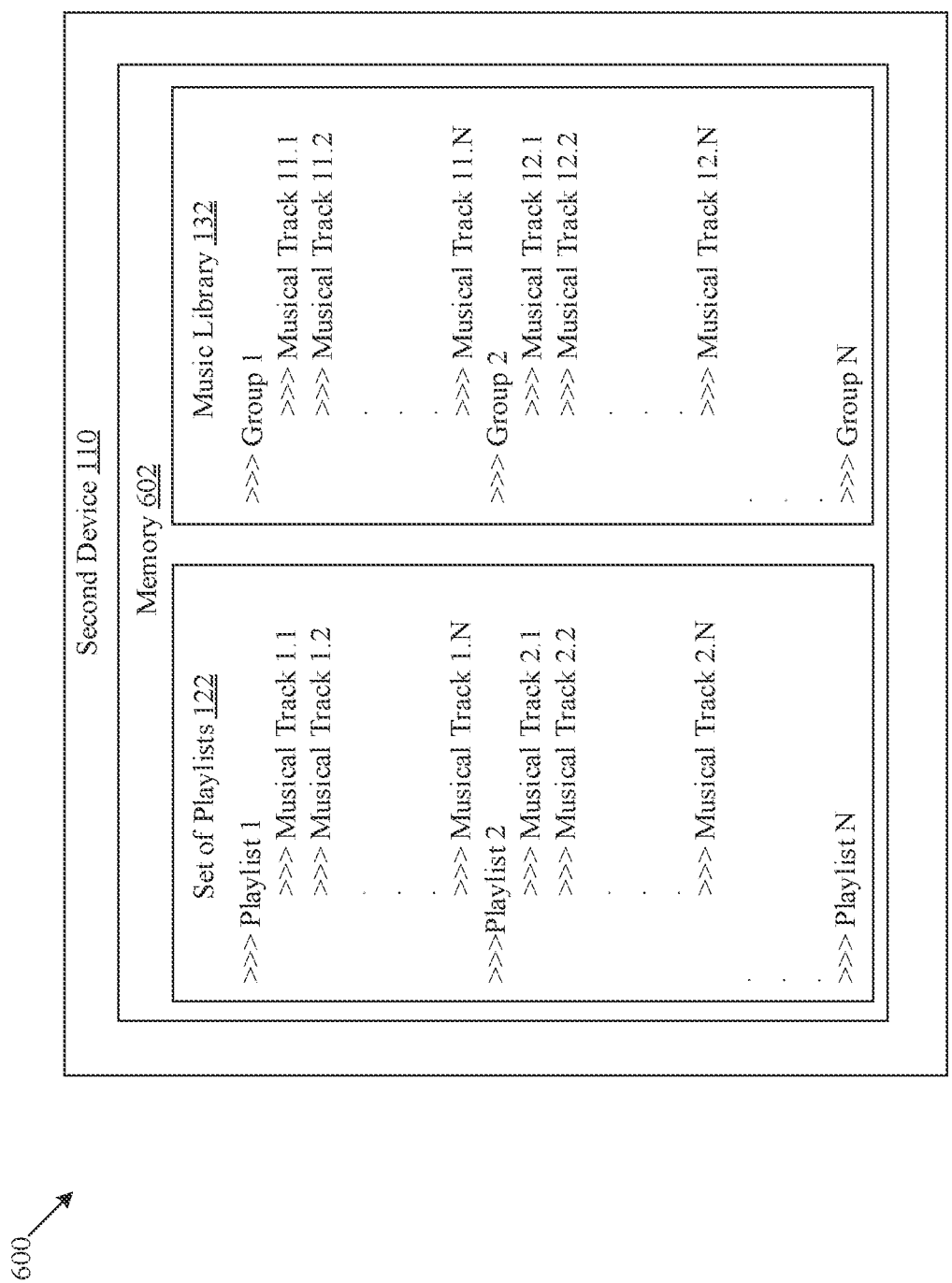
FIG. 6 is a block diagram that illustrates an exemplary second device associated with a second music listening service, in accordance with an embodiment of the disclosure.

FIG. 6 is a block diagram that illustrates an exemplary second device associated with a second music listening service, in accordance with an embodiment of the disclosure. FIG. 6 is explained in conjunction with elements from FIGS. 1-5. With reference to FIG. 6, there is shown a block diagram 600 that illustrates the second device 110. The second music listening service 108 may be associated with the second device 110. For example, a music application managed by the second music listening service 108 may be accessible on the second device 110 via an application interface or a web client.

In an embodiment, the second device 110 may include a memory 602 to store the set of playlists 122. The set of playlists 122 may include, for example, playlist 1, playlist 2, . . . , playlist n. Each playlist may list one or more musical tracks. As an example, playlist 1 may include musical track 1.1, musical track 1.2, . . . , musical track 1.n. Similarly, playlist 2 may include one or more musical tracks. The information associated with each playlist may include at least one of a musical category tag or metadata associated with each musical track of one or more musical tracks listed in the corresponding playlist.

In an embodiment, the memory 602 may store the music library 132. The music library 132 may include musical tracks categorized or grouped into, for example, group 1 1, group 2, . . . , group n. Each group or category may list one or more musical tracks. As an example, group 1 may include musical track 2.1, musical track 2.2, . . . , musical track 2.n marked as favorite by the user 302. Similarly, group 2 may include one or more musical tracks liked by the user 302. Similarly, group n may include on or more musical tracks filtered to be listened later by the user 302. Information associated with each group may include at least one of a musical category tag or metadata associated with each musical track of one or more musical tracks listed in the corresponding group.

Figure 7:
FIG. 7 is a block diagram that illustrates an exemplary second device associated with a second music listening service, in accordance with an embodiment of the disclosure.

FIG. 7 is a block diagram that illustrates an exemplary second device associated with a second music listening service, in accordance with an embodiment of the disclosure. FIG. 7 is explained in conjunction with elements from FIGS. 1-6. With reference to FIG. 7, there is shown a block diagram 700 that illustrates content of the set of playlists 122 stored in the memory of the second device 110. The content of each playlist of the set of playlists 122 may indicate a musical category tag 702, a title 704, a genre 706, an artist 708, or a time 710 of addition of a track to respective playlist. By way of example, and not limitation, information associated with the playlist 1 may include a musical category tag 702-1, a title 704-1 of the musical track 1.1, a genre 706-1 of the musical track 1.1, an artist 708-1 of the musical track 1.1, or a time 710-1 of addition of the musical track 1.1 in the playlist 1. As an example, the time 710-1 may include date (in format dd:mm:yyyy) and time (in format hh:mm:ss) of addition of the musical track 1.1 in the playlist 1.

Figure 8:
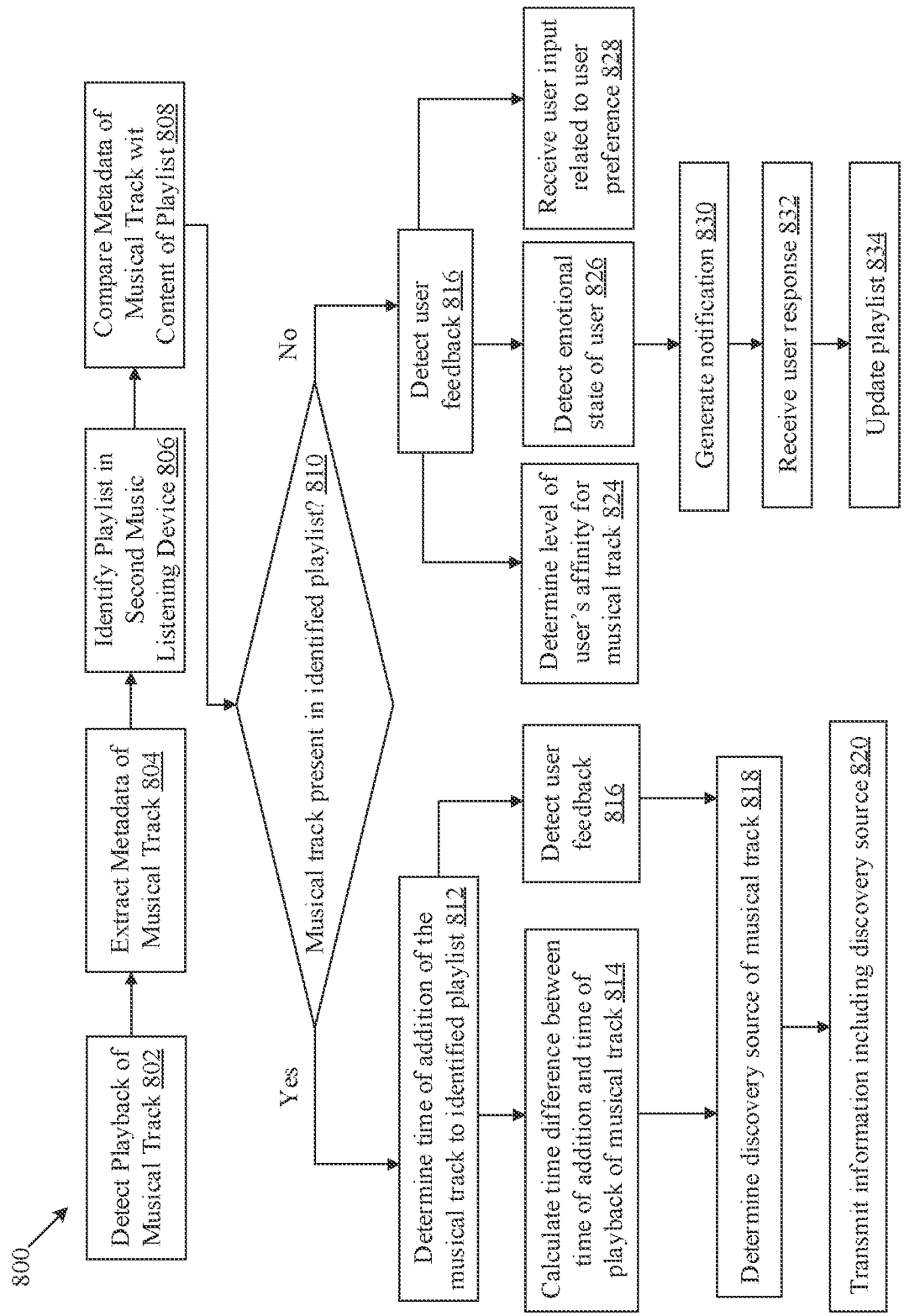
FIG. 8 is a block diagram that illustrates an exemplary flow diagram for source discovery of music for music listening services and recommending new musical tracks for playlists, in accordance with an embodiment of the disclosure.

FIG. 8 is a block diagram that illustrates an exemplary flow diagram for source discovery of music for music listening services and recommending new musical tracks for playlists or music library, in accordance with an embodiment of the disclosure. FIG. 8 is explained in conjunction with elements from FIGS. 1-7. With reference to FIG. 8, there is shown a block diagram 800 that illustrates exemplary operations for determination of the discovery source of the musical track 120 and generation of a notification and prompt to add the musical track 120 as a list item of the set of playlists 122 or the music library 132. The exemplary operations illustrated in the block diagram 800 may be performed by any computing system, apparatus, or device, such as by the electronic device 102 of FIG. 1, or the circuitry 202 of FIG. 2.

At 802, the electronic device 102 may detect a playback of the musical track 120 associated with the first music listening service 104. In an embodiment, the playback of the musical track 120 may be detected inside the vehicle 304. The musical track 120 may be played on the first device 106 based on broadcast or streaming music data received from a content delivery station (e.g., a server or a broadcast station) of the first music listening service 104. By way of example, and not limitation, a user such as (the user 302) may provide an input via an interface to use the first music listening service 104 to play a musical track, for example, while driving the vehicle 304. In an example, the first music listening service 104 may provide a live streaming of the music. Examples of the first music listening service 104 may include, but are not limited to, an on-demand music streaming service, an Internet radio service, or a music broadcast service.

At 804, the electronic device 102 may extract metadata associated with the musical track 120. By way of example and not limitation, the metadata may include at least one of the title 418 of the musical track 120, the genre 420 of the musical track 120, one or more artists 422 associated with the musical track 120, the time 416 of the playback of the musical track 120, a geo-location where the playback of the musical track 120 is detected, or an environment around the geo-location where the playback of the musical track 120 is detected. In an embodiment, the metadata associated with the musical track 120 may be stored temporarily in the memory 206 of the electronic device 102.

At 806, the electronic device 102 may identify a playlist, the set of playlists 122, or the music library 132 by accessing the user data associated with the second music listening service 108. in an example, the second music listening service 108 may be an on-demand music streaming service and may be different from the first music listening service 104. The electronic device 102 may access the user data from the database 116 by sending a request to the server 114 to access records stored in the database 116. Alternatively, the user data may be accessed via an API call to the server 114 or a request to a music application that stores the user data locally. The user data may include user profile information which may correspond to, but not limited to, a username, a user email-id, a set of user preferences, a list of user's playlists, or user account details for the second music listening service 108.

At 808, the electronic device 102 may compare at least one of the title 418 of the musical track 120, the genre 420 of the musical track 120, or one or more artists 422 associated with the musical track 120 with the content of the set of playlists 122 or the music library 132 associated with the second music listening service 108. Each playlist may include a listing of one or more musical tracks along with timestamps of addition of musical tracks to a respective playlist. For example, playlist 1 may list a musical track 1.1, a musical track 1.2, . . . , a musical track 1.n. Similarly, playlist 2 may list one or more musical tracks. Information associated with each playlist may include at least one of musical category tag or metadata associated with each musical track of one or more musical tracks listed in a corresponding playlist. The musical category tag may define a category of the playlist. For example, the user 302 may have created a playlist of music to listen while exercising, playing, driving, cooking or performing any other activity. The playlists may be categorized based on the musical category tag associated with the playlists. The playlists may be given musical category tags based on a type of music in the playlists, artists of music in the playlists, or genre(s) of music in the playlists. By way of example and not limitation, information associated with playlist 1 may include a musical category tag 702-1, a title 704-1 of the musical track 1.1, a genre 706-1 of the musical track 1.1, an artist 708-1 of the musical track 1.1, or a time 710-1 of addition of the musical track 1.1 to the playlist 1. The time 710-1 may include date (in format dd:mm:yyyy) and time (in format hh:mm:ss) of addition of the musical track 1.1 in the playlist 1.

In an embodiment, the electronic device 102 may compare an item from a set of the title 418 of the musical track 120, the genre 420 of the musical track 120, or one or more artists 422 associated with the musical track 120 with a corresponding item in the content of the set of playlists 122 or the music library 132. The result of the comparison may determine a presence of the musical track 120 in the set of playlists 122 or the music library 132.

At 810, the electronic device 102 may determine whether the musical track 120 is present in any list of the set of playlists 122 or the music library 132 associated with the second music listening service 108. The electronic device 102 may detect the musical track 120 based on a result of the comparison. The musical track 120 may be detected in at least one of the set of playlists 122 or the music library 132 if the metadata of the musical track 120 matches with the content of at least one of the set of playlists 122 or the music library 132. As an example, the musical track 120 may be determined to be present in the set of playlists 122 if the title 418, the genre 420, or one or more artists 422 associated with the musical track 120 is identified in the content of the set of playlists 122 or the music library 132 (which includes a set of a title 704, a genre 706, or an artist 708 of each musical track of the set of playlists 122). In another example, the musical track 120 may be determined to be a missing list item or may be identified as absent in the set of playlists 122 or the music library 132 if the title 418, the genre 420, and/or one or more artists 422 associated with the musical track 120 is not identified in the content of the set of playlists 122 or the music library 132.

In an embodiment, the electronic device 102 may determine a degree of similarity between the musical track 120 and each musical track of a set of musical tracks that may be listed in content of the set of playlists 122 or the music library 132. The electronic device 102 may determine the musical track 120 to be a missing list item of the set of playlists 122 or the music library 132 further based on a determination that the degree of similarity is below a threshold.

At 812, if the musical track 120 is detected in the set of playlists 122, the electronic device 102 may determine the time 710 of addition of the musical track 120 to the identified playlist of the set of playlists 122 or the music library 132. The electronic device 102 may also determine the time 416 of the playback of the musical track 120.

At 814, the electronic device 102 may calculate a time difference between the time 416 of the playback of the musical track 120 and the time 710 of addition of the musical track 120 to the identified playlist of the set of playlists 122 or the music library 132.

At 816, the electronic device 102 may detect a user feedback for the playback of the musical track 120. The user feedback may correspond to, but not limited to, any activity or reaction of the user 302 which may occur while or after listening the musical track 120. In accordance with an embodiment, the user feedback may correspond to a reaction of the user 302 to the musical track 120 while driving the vehicle 304. By way of example and not limitation, the user feedback may correspond to an increase in a volume of the musical track 120 in a duration of the playback of the musical track 120. Additionally, or alternatively, the user feedback may correspond to a humming sound that resembles a tune or a melody of the musical track 120.

At 818, the electronic device 102 may determine the discovery source of the musical track 120 as one of the first music listening service 104 or the second music listening service 108, based on the time 416 of the playback of the musical track 120 and the time 710 of addition of the musical track 120 to at least one playlist of the set of playlists 122 or the music library 132.

The electronic device 102 may determine the discovery source as the first music listening service 104 if the time 416 of the playback of the musical track 120 precedes the time 710 of addition of the musical track 120 to the set of playlists 122 or the music library 132. Alternatively, the electronic device 102 may determine the discovery source as the second music listening service 108 if the time 710 of addition of the musical track 120 to the set of playlists 122 or the music library 132 precedes the time 416 of the playback of the musical track 120.

In some instances, the user 302 who may have listened to the musical track 120 at some point in time may decide to add the musical track 120 or a variation of the musical track 120 to the set of playlists 122 or the music library 132 after a certain period of time. Any delay associated with the addition of the musical track 120 or the variation of the musical track 120 may have to be monitored to determine the discovery source with a suitable confidence or accuracy. For instance, if the delay is more than a day, then it may be difficult to correctly determine the discovery source with a suitable accuracy. A threshold time period (e.g., 2-5 hours) may be used as a reference to filter potential discovery sources. Specifically, the discovery source for the musical track 120 may be determined as one of the first music listening service 104 or the second music listening service 108, based on a determination that the calculated time difference is less than or equal to the threshold time period. In another embodiment, the discovery source of the musical track 120 may be determined as one of the first music listening service 104 or the second music listening service 108, further based on the user feedback.

At 820, the electronic device 102 may transmit information including the discovery source to the data collection system 130 associated with the second music listening service 108. The information may help the second music listening service 108 to maintain a record of discovery sources of every song or musical track that the user 302 may add to the set of playlists 122 or the music library 132. In an example, the data collection system 130 may maintain such record for every user of the second music listening service 108. This information may enable the second music listening service 108 to build more accurate user profile, improve user experience with a music application associated with the second music listening service 108, and target the user 302 with more useful music recommendations.

At 822, similar to operation performed at 816, the electronic device 102 may detect the user feedback for the playback of the musical track 120. The user feedback may correspond to, but not limited to, any activity or reaction of the user 302 while or after listening the musical track 120. By way of example, and not limitation, the user feedback may correspond to an increase in a volume of the musical track 120 in a duration of the playback of the musical track 120. Additionally, or alternatively, the user feedback may correspond to a humming sound that may resemble a tune or a melody of the musical track 120.

At 824, the electronic device 102 may determine a level of user's affinity for the musical track based on the user feedback. By way of example, and not limitation, when the user 302 listens to the musical track 120, the user's affinity for the musical track 120 may indicate an extent by which the user 302 likes the musical track 120. The user's affinity for the song or the musical track may be classified into levels such as, but not limited to, "most liked", "liked", or "disliked".

At 826, the electronic device 102 may receive, from the set of sensors 118, information associated with an emotional state of the user 302 associated with the electronic device 102. By way of example and not limitation, the emotional state of the user 302 may indicate a neutral state, a happy state, a sad state, or an excited state.

At 828, the electronic device 102 may receive an input that includes a user preference for music-related notifications. As an example, the user preference may include a preference for a particular title of a musical track, a particular genre of the musical track, a particular artist associated with the musical track, or a particular time when the playback of the musical track is detected. In another example, the user preference may define a condition to render the prompt if the musical track is associated with at least one of a preferred artist, a preferred genre, or a preferred music type.

At 830, if the musical track 120 is determined to be the missing list item or absent in the set of playlists 122 or the music library 132, then the electronic device 102 may generate the notification that includes the information associated with the musical track 120 and the prompt to add the musical track 120 as the list item of a playlist of the set of playlists 122 or the music library 132. Details of the notification and the prompt are provided, for example, in FIGS. 9A, 9B, 9C, and 9D. In an embodiment, the notification and the prompt to add the musical track 120 to the playlist further based on the level of user's affinity for the musical track 120. In another embodiment, the electronic device 102 may generate the notification and the prompt to add the musical track 120 to a playlist of the set of playlists 122 or the music library 132 further based on a determination that the emotional state of the user 302 matches the genre 420 or a theme of the musical track 120. In another embodiment, the electronic device 102 may generate the notification and the prompt to add the musical track 120 to a playlist of the set of playlists or the music library 132 further based on the user preference.

In an embodiment, the electronic device 102 may identify one or more musical category tags 702 associated with each playlist of the set of playlists 122. As shown in FIG. 7, for example, the playlist 1 has a musical category tag 702-1 and playlist n has a musical category tag 702-n. From the set of playlists 122, the electronic device 102 may select a playlist for which the one or more musical category tags match with a musical category tag of the musical track 120. The notification and the prompt to add the musical track 120 to the selected playlist may be performed further based on the selection of the playlist. The notification may include information that indicates the selected playlist for addition of the musical track 120.

At 832, the electronic device 102 may receive a user response to the prompt via a display or an I/O device. Details of the prompt displayed on the display are described, for example, in FIGS. 9A, 9B, 9C, and 9D. The user response may include an acceptance or a rejection of the prompt to add the musical track 120 to the selected playlist.

At 834, the electronic device 102 may update the playlist or the music library 132 to include the list item corresponding to the musical track 120. In an example, the electronic device 102 may add the musical track 120 to the selected playlist or the music library 132 when the user 302 accepts the prompt. Operations to add the musical track 120 may be ignored to the selected playlist if the user 302 rejects the prompt.

Figure 9A:
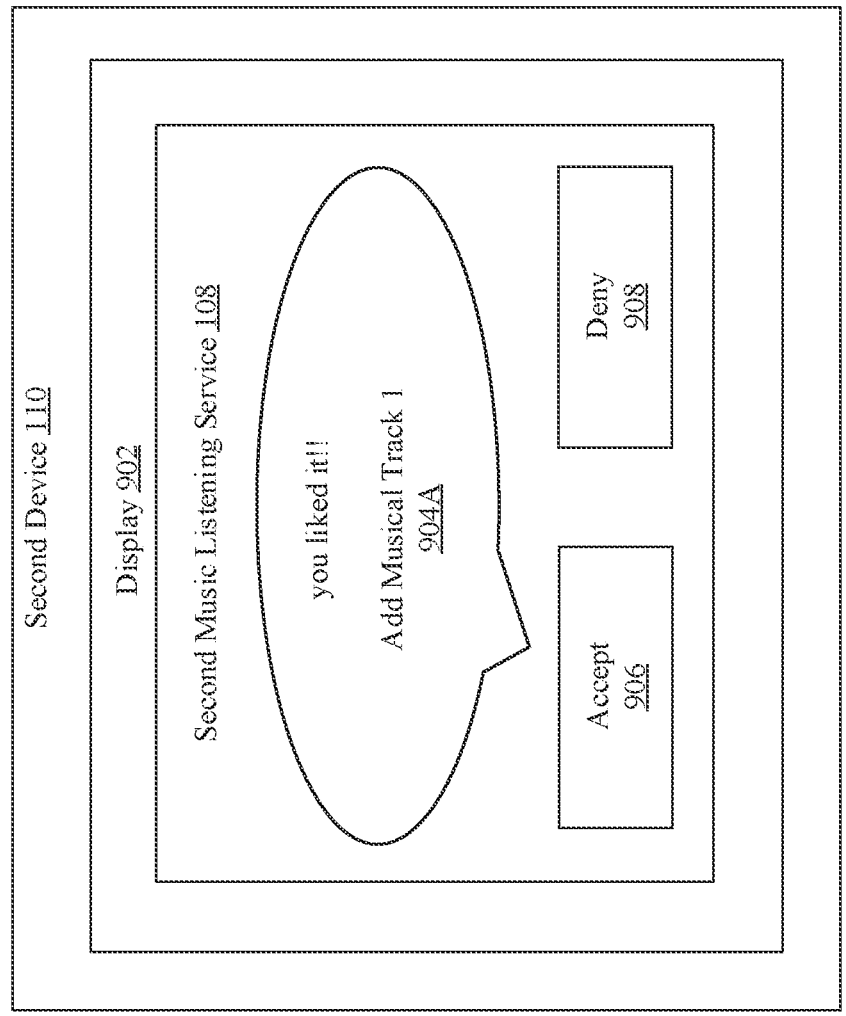
FIG. 9A is a block diagram that illustrates a display of notification on an exemplary second device associated with a second music listening service, in accordance with an embodiment of the disclosure.

FIG. 9A is a block diagram that illustrates a display of notification on an exemplary second device associated with a second music listening service, in accordance with an embodiment of the disclosure. FIGS. 9A, 9B, 9C, and 9D are explained in conjunction with elements from FIGS. 1-8. With reference to FIG. 9A, there is shown a scenario where the electronic device 102 may control the display 902 to render the generated notification 904A. In an embodiment, the electronic device 102 may determine content of the notification 904A based on a level of user's affinity for the musical track 120. The user 302 may provide response to accept 906 or deny 908 the prompt to add the recommended musical track 120. Based on the user response, the electronic device 102 may update the set of playlists 122 to include the musical track 120. In an example, the content of the notification 904A may include a message that reminds the user 302 that he liked the musical track 120.

Figure 9B:
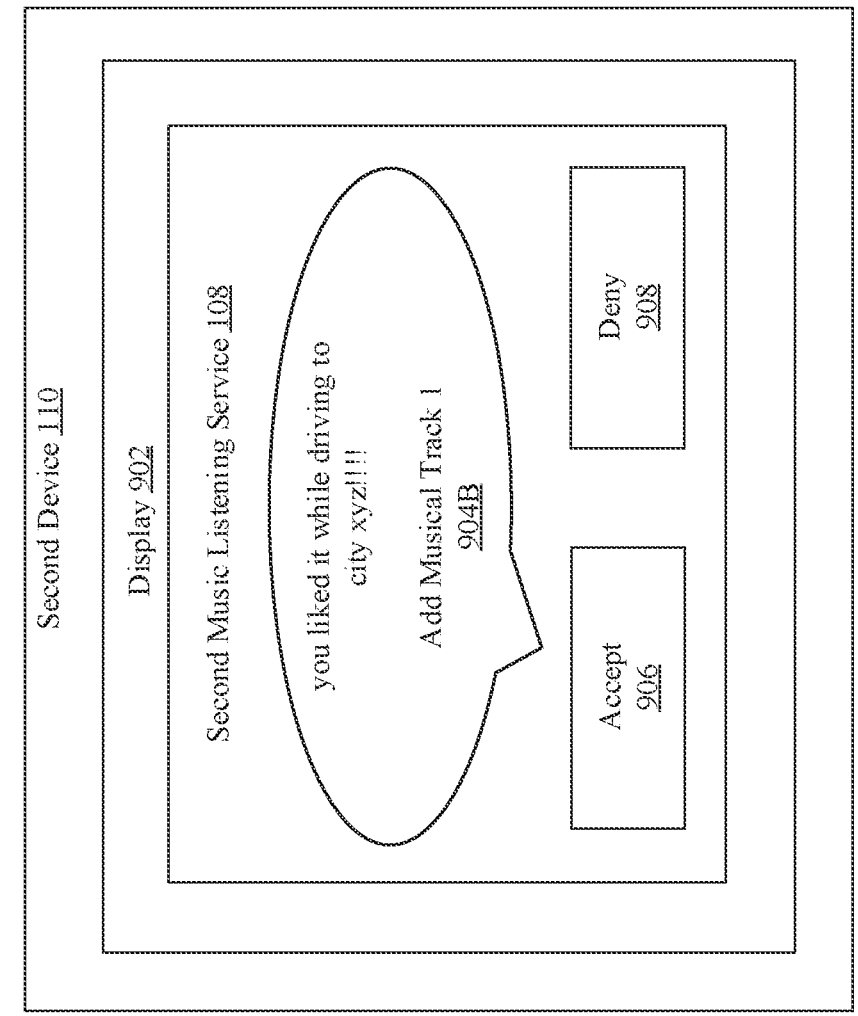
FIG. 9B is a block diagram that illustrates a display of notification on an exemplary second device associated with a second music listening service, in accordance with an embodiment of the disclosure.

FIG. 9B is a block diagram that illustrates a display of notification on an exemplary second device associated with a second music listening service, in accordance with an embodiment of the disclosure. FIG. 9B is explained in conjunction with elements from FIGS. 1-8 and 9A. With reference to FIG. 9B, there is shown a scenario where the electronic device 102 may control the display 902 to render the generated notification 904B. The electronic device 102 may determine content of the notification 904B based on at least one of the geo-location where the playback of the musical track 120 is detected or environment around the geo-location where the playback of the musical track 120 is detected. The user 302 may provide a response to accept 906 or deny 908 the prompt to add the recommended musical track 120 to the playlist. Based on the user response, the electronic device 102 may update at least one playlist of the set of playlists 122 to include the musical track 120. As an example, the content of the notification 904B may include a message that reminds the user 302 that the user 302 may have liked the musical track 120 while driving to a particular city or location. The message may also include other musical tracks 120 that the user 302 may have liked while driving. The notification may enable the second music listening service 108 to provide user-preferred songs as recommendations, thus increasing user satisfaction with the second music listening service 108.

Figure 9C:
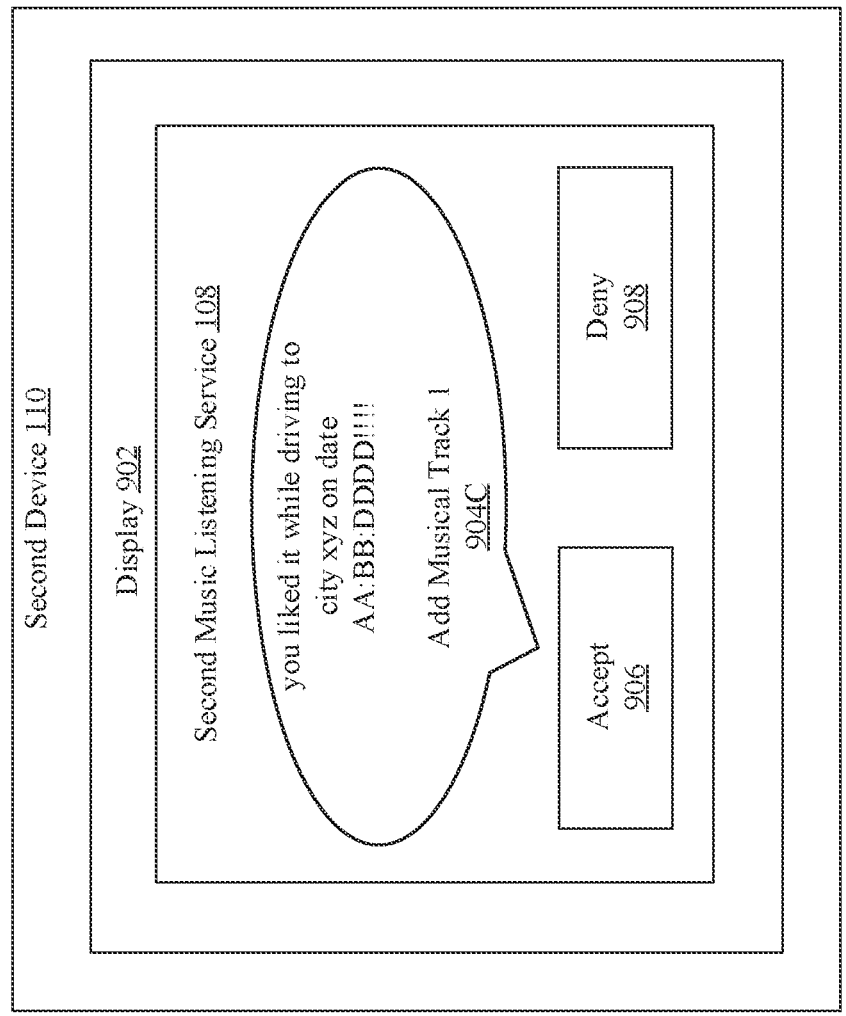
FIG. 9C is a block diagram that illustrates a display of notification on an exemplary second device associated with a second music listening service, in accordance with an embodiment of the disclosure.

FIG. 9C is a block diagram that illustrates a display of notification on an exemplary second device associated with a second music listening service, in accordance with an embodiment of the disclosure. FIG. 9B is explained in conjunction with elements from FIGS. 1-8 and 9A-9B. With reference to FIG. 9C, there is shown a scenario where the electronic device 102 may control the display 902 to render the generated notification 904C. During operation, the electronic device 102 may determine content of the notification 904C based on the time 416 of the playback of the musical track 120 and at least one of the geo-location where the playback of the musical track 120 is detected, or the environment around the geo-location where the playback of the musical track 120 is detected. The user 302 may provide a response to accept 906 or deny 908 the prompt to add the recommended musical track 120 to the playlist. Based on the user response, the electronic device 102 may update at least one playlist of the set of playlists 122. As an example, the content of the notification 904C may include a message that reminds the user 302 that he may have liked the musical track 120 while driving to a particular city or location on a particular date or time.

FIG. 9D is a block diagram that illustrates a display of notification on an exemplary second device associated with a second music listening service, in accordance with an embodiment of the disclosure. FIG. 9D is explained in conjunction with elements from FIGS. 1-8 and 9A-9C. With reference to FIG. 9D, there is shown a scenario where the electronic device 102 may control the display 902 to render the generated notification 904D.

During operation, the electronic device 102 may select, from the set of playlists 122, a playlist for which the one or more musical category tags 702 match with a musical category tag of the musical track 120. The content of the notification 904D may be determined based on the selected playlist. The user 302 may provide a response to accept 906 or deny 908 the prompt to add the recommended musical track 120 to the playlist. Based on the user response, the electronic device 102 may update the set of playlists 122 to include the musical track 120. As an example, the content of the notification 904D may include a message that indicates a suitable playlist for adding the recommended musical track 120.

Figure 10:
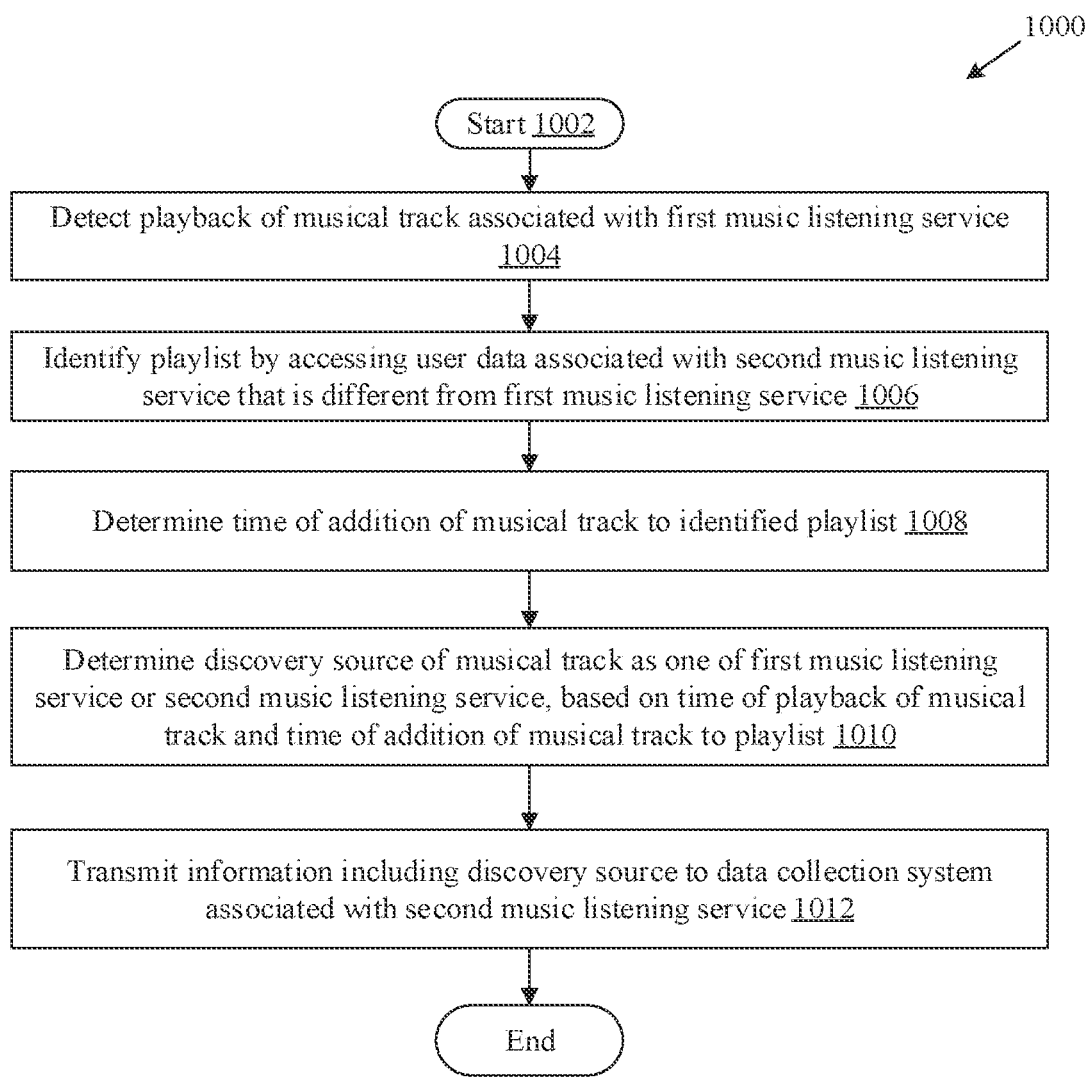
FIG. 10 is a flowchart that illustrates exemplary operations for discovery of music source for music listening services, in accordance with an embodiment of the disclosure.

FIG. 10 is a flowchart that illustrates exemplary operations for discovery of music source for music listening services, in accordance with an embodiment of the disclosure. FIG. 10 is explained in conjunction with elements from FIGS. 1-8, 9A, 9B, 9C, and 9D. With reference to FIG. 10, there is shown a flowchart 1000. The operations from 1002 to 1014 may be implemented on any computing device, for example, the electronic device 102 or the circuitry 202. The operations may start at 1002 and proceed to 1004.

At 1004, the playback of the musical track 120 associated with the first music listening service 104 may be detected. In one or more embodiments, the circuitry 202 may detect the playback of the musical track 120 associated with the first music listening service 104. The details about the detection of the playback of the musical track 120 are provided for example, in FIGS. 1 and 2.

At 1006, the list of tracks may be identified by accessing user data associated with the second music listening service 108 that is different from the first music listening service 104. In one or more embodiments, the circuitry 202 may identify the list of tracks by accessing user data associated with the second music listening service 108 that is different from the first music listening service 104. The list of tracks may include at least one of the playlist or the music library 132 of favorite tracks The details about the identification of the list of tracks are provided, for example, in FIGS. 1 and 4-8.

At 1008, the time of addition of the musical track 120 to the identified list of tracks may be determined. In one or more embodiments, the circuitry 202 may determine the time of addition of the musical track 120 to the identified list of tracks. The details about the time of addition of the musical track 120 are provided, for example, in FIG. 7.

At 1010, the discovery source of the musical track 120 as one of the first music listening service 104 or the second music listening service 108 may be determined based on the time of the playback of the musical track 120 and the time of addition of the musical track 120 to the list of tracks. In one or more embodiments, the circuitry 202 may determine the discovery source of the musical track 120 as one of the first music listening service 104 or the second music listening service 108, based on the time of the playback of the musical track 120 and the time of addition of the musical track 120 to the list of tracks. The details about the determination of discovery source are provided, for example, in FIGS. 1 and 4-7.

At 1012, the information including the discovery source to the data collection system 130 associated with the second music listening service 108 is transmitted. In one or more embodiments, the circuitry 202 may transmit the information including the discovery source to the data collection system 130 associated with the second music listening service 108. Control may pass to end.

Figure 11:
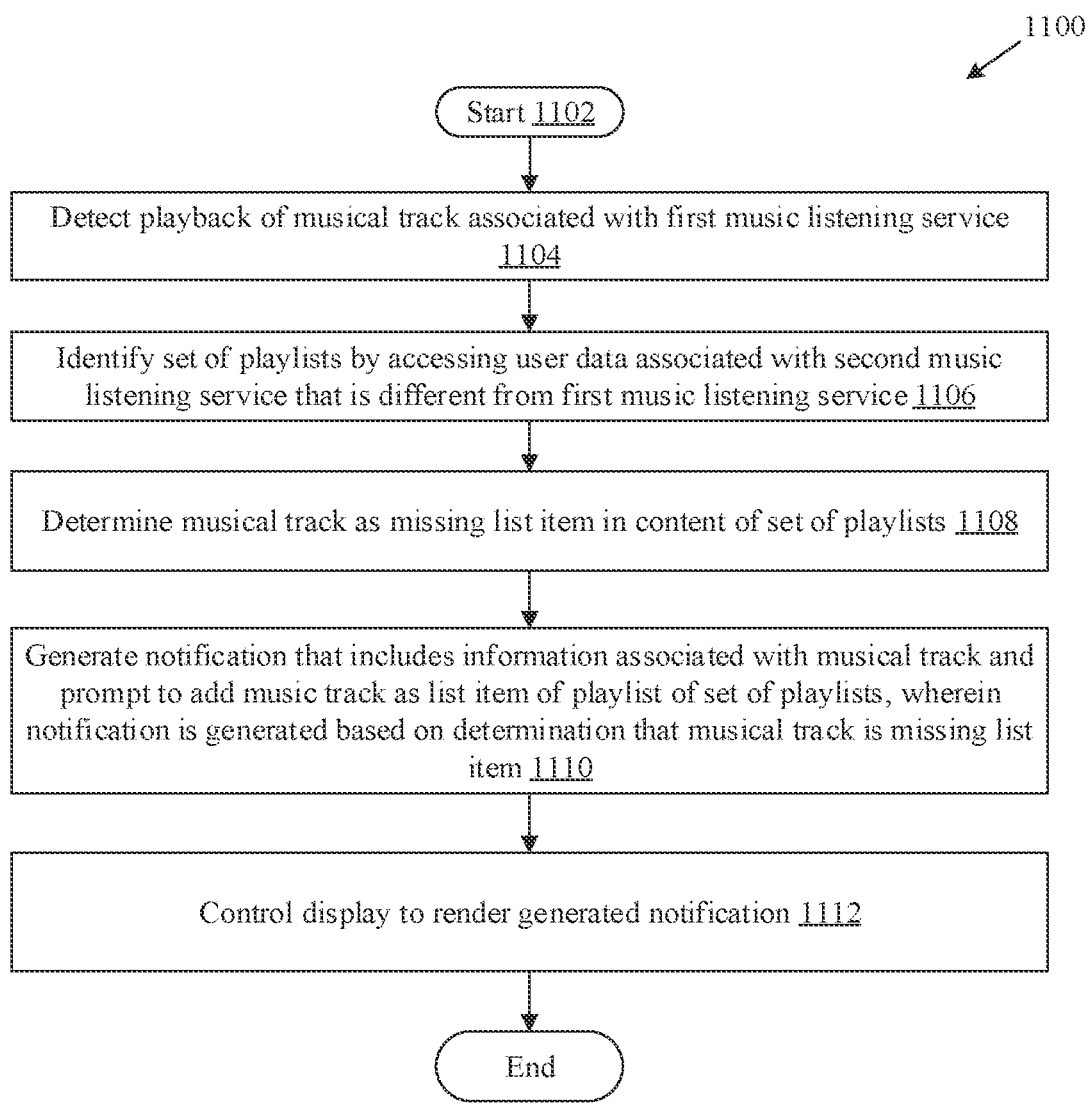
FIG. 11 is a flowchart that illustrates exemplary operations for recommending new musical tracks for playlists or music library, in accordance with an embodiment of the disclosure.

FIG. 11 is a flowchart that illustrates exemplary operations for recommending new musical tracks for playlists or music library, in accordance with an embodiment of the disclosure. FIG. 11 is explained in conjunction with elements from FIGS. 1-8, 9A, 9B, 9C, and 9D. With reference to FIG. 11, there is shown a flowchart 1100. The operations from 1102 to 1114 may be implemented on any computing device, for example, the electronic device 102 or the circuitry 202. The operations may start at 1102 and proceed to 1104.

At 1104, the playback of the musical track 120 associated with the first music listening service 104 may be detected. In one or more embodiments, the circuitry 202 may detect the playback of the musical track 120 associated with the first music listening service 104. The details about the detection of the playback of the musical track 120 are provided for example, in FIGS. 1 and 2.

At 1106, the list of tracks may be identified by accessing the user data associated with the second music listening service 108 that is different from the first music listening service 104. In one or more embodiments, the circuitry 202 may identify the list of tracks by accessing the user data associated with the second music listening service 108 that is different from the first music listening service 104. The list of tracks may include at least one of the set of playlists 122 or the music library 132 of favorite tracks. The details about the identification of the playlist are provided, for example, in FIGS. 1 and 4-8.

At 1108, the musical track 120 may be determined as the missing list item in the content of the list of tracks. In one or more embodiments, the circuitry 202 may determine the musical track 120 as the missing list item in the content of the list of tracks. The details about the time of addition of the musical track 120 are provided, for example, in FIG. 7.

At 1110, the notification 904A, 904B, 904C, or 904D that includes the information associated with the musical track 120 and the prompt to add the musical track 120 as the list item of the list of tracks may be generated. The notification 904A, 904B, 904C, or 904D may be generated based on the determination that the musical track 120 is the missing list item. In one or more embodiments, the circuitry 202 may generate the notification 904A, 904B, 904C, or 904D that includes the information associated with the musical track 120 and the prompt to add the musical track 120 as the list item of the list of tracks. The notification 904A, 904B, 904C, or 904D may be generated based on the determination that the musical track 120 is the missing list item. The details about the determination of discovery source are provided, for example, in FIGS. 1 and 8-11.

At 1112, the display 902 may be controlled to render the generated notification 904A, 904B, 904C, or 904D. In one or more embodiments, the circuitry 202 may control the display 902 to render the generated notification 904A, 904B, 904C, or 904D. The details about the determination of discovery source are provided, for example, in FIGS. 1 and 8-11. Control may pass to end.

Various embodiments of the disclosure may provide a non-transitory computer-readable medium and/or storage medium having stored thereon, computer-executable instructions executable by a machine and/or a computer such as the electronic device 102. The computer-executable instructions may cause the machine and/or computer to perform operations that may include detection of the playback of the musical track 120 associated with the first music listening service 104. The operations may further include identification of the list of tracks by accessing user data associated with the second music listening service 108 that is different from the first music listening service 104. The list of tracks may include at least one of the set of playlists 122 or the music library 132 of favorite tracks. The operations may further include determination of the musical track 120 as the missing list item in the content of the list of tracks. The operations may further include generation of the notification 904A, 904B, 904C, or 904D that includes the information associated with the musical track 120 and the prompt 906 to add the musical track as the list item of the list of tracks. The notification 904A, 904B, 904C, or 904D is generated based on the determination that the musical track 120 is the missing list item. The operations may further include controlling the display 902 to render the generated notification 904A, 904B, 904C, or 904D.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure not to be limited to the particular embodiment disclosed, but that the present disclosure will include all embodiments that fall within the scope of the appended claims.

What is claimed is:

1. An electronic device, comprising:
   circuitry that:
   detects, based on an audio signal detected by a sensor, a playback of a musical track associated with a first music listening service, wherein the musical track is played back on a first device including a first memory that stores information of the musical track;
   identifies a list of tracks by accessing user data associated with a second music listening service that is different from the first music listening service, wherein the list of tracks includes at least one of a set of playlists or a music library of favorite tracks stored in a second memory associated with the second music listening service;
   determines the musical track as a missing list item in content of the list of tracks stored in the second memory associated with the second music listening service;
   generates a notification that includes the information associated with the musical track and a prompt to add the musical track as a list item of the list of tracks, wherein the notification is generated based on the determination that the musical track is the missing list item; and
   controls a display to render the generated notification.

2. The electronic device according to claim 1, wherein the first music listening service is an on-demand music streaming service, an Internet radio service, or a music broadcast service.

3. The electronic device according to claim 1, wherein the second music listening service is an on-demand music streaming service.

4. The electronic device according to claim 1, wherein
   the circuitry further extracts metadata associated with the musical track, and
   the metadata includes at least one of a title of the musical track, a genre of the musical track, one or more artists associated with the musical track, a time of the playback of the musical track, a geo-location where the playback of the musical track is detected, or an environment around the geo-location where the playback of the musical track is detected.

5. The electronic device according to claim 4, wherein the circuitry further:
compares at least one of the title of the musical track, the genre of the musical track, or the one or more artists associated with the musical track with the content of the list of tracks associated with the second music listening service; and
determines the musical track as the missing list item, further based on the comparison.

6. The electronic device according to claim 1, wherein the circuitry further:
detects a user feedback for the playback of the musical track; and
determines a level of user's affinity for the musical track based on the user feedback, wherein the notification is generated further based on the level of user's affinity.

7. The electronic device according to claim 6, wherein the user feedback corresponds to an increase in a volume of the musical track in a duration of the playback of the musical track.

8. The electronic device according to claim 6, wherein the user feedback corresponds to a humming sound that resembles a tune or a melody of the musical track.

9. The electronic device according to claim 1, wherein the circuitry further determines a degree of similarity between the musical track and each musical track of a set of musical tracks that is listed in the content of the list of tracks, and wherein the musical track is determined to be the missing list item further based on a determination that the degree of similarity is below a threshold.

10. The electronic device according to claim 1, wherein the circuitry further:
identifies one or more musical category tags associated with each playlist of the list of tracks; and
selects, from the set of playlists, a playlist for which the one or more musical category tags match with a musical category tag of the musical track, wherein the notification is generated further based on the selection of the playlist.

11. The electronic device according to claim 1, further comprising a set of sensors that detects an emotional state of a user associated with the electronic device, and wherein the notification is generated further based on a determination that the emotional state matches a genre or a theme of the musical track.

12. The electronic device according to claim 1, wherein the circuitry further receives an input that includes a user preference for the notification, and wherein the notification is generated further based on the user preference.

13. The electronic device according to claim 12, wherein the user preference defines a condition to render the prompt if the musical track is associated with at least one of a preferred artist, a preferred genre, or a preferred music type.

14. The electronic device according to claim 1, wherein the circuitry further:
receives a user response to the prompt via the display; and
updates the list of tracks to include the list item corresponding to the musical track.

15. A method, comprising:
detecting, based on an audio signal detected by a sensor, a playback of a musical track associated with a first music listening service, wherein the musical track is played back on a first device including a first memory that stores information of the musical track;
identifying a list of tracks by accessing user data associated with a second music listening service that is different from the first music listening service, wherein the list of tracks includes at least one of a set of playlists or a music library of favorite tracks stored in a second memory associated with the second music listening service;
determining the musical track as a missing list item in content of the list of tracks stored in the second memory associated with the second music listening service;
generating a notification that includes the information associated with the musical track and a prompt to add the musical track as a list item of the list of tracks, wherein the notification is generated based on the determination that the musical track is the missing list item; and
controlling a display to render the generated notification.

16. The method according to claim 15, wherein the first music listening service is an on-demand music streaming service, an Internet radio service, or a music broadcast service.

17. The method according to claim 15, wherein the second music listening service is an on-demand music streaming service.

18. The method according to claim 15, further comprising extracting metadata associated with the musical track, wherein the metadata includes at least one of a title of the musical track, a genre of the musical track, one or more artists associated with the musical track, a time of the playback of the musical track, a geo-location where the playback of the musical track is detected, or an environment around the geo-location where the playback of the musical track is detected.

19. The method according to claim 18, further comprising:
comparing at least one of the title of the musical track, the genre of the musical track, or the artists associated with the musical track with the content of the list of tracks associated with the second music listening service; and
determining the musical track as the missing list item, further based on the comparison.

20. A non-transitory computer-readable medium having stored thereon, computer-executable instructions which, when executed by a computer, cause the computer to execute operations, the operations comprising:
detecting, based on an audio signal detected by a sensor, a playback of a musical track associated with a first music listening service, wherein the musical track is played back on a first device including a first memory that stores information of the musical track;
identifying a list of tracks by accessing user data associated with a second music listening service that is different from the first music listening service, wherein the list of tracks includes at least one of a set of playlists or a music library of favorite tracks stored in a second memory associated with the second music listening service;
determining the musical track as a missing list item in content of the list of tracks stored in the second memory associated with the second music listening service; and
generating a notification that includes the information associated with the musical track and a prompt to add the musical track as a list item of the list of tracks, wherein the notification is generated based on the determination that the musical track is the missing list item; and
controlling a display to render the generated notification.

* * * * *